United States Patent
Kilani et al.

(10) Patent No.: US 10,651,730 B2
(45) Date of Patent: May 12, 2020

(54) METHODS AND APPARATUS FOR SIMULTANEOUSLY GENERATING MULTIPLE OUTPUT VOLTAGE LEVELS UTILIZING SWITCHED CAPACITOR DC-DC CONVERTER

(71) Applicant: Khalifa University of Science and Technology, Abu Dhabi (AE)

(72) Inventors: Dima Kilani, Abu Dhabi (AE); Baker Mohammad, Austin, TX (US); Mohammad Radwan Alhawari, Abu Dhabi (AE); Hani Hasan Mustafa Saleh, Round Rock, TX (US); Mohammed Ismail Elnaggar, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 0 days.

(21) Appl. No.: 16/039,551

(22) Filed: Jul. 19, 2018

(65) Prior Publication Data

US 2019/0081558 A1    Mar. 14, 2019

Related U.S. Application Data

(60) Provisional application No. 62/557,095, filed on Sep. 11, 2017.

(51) Int. Cl.
*H02M 3/07* (2006.01)
*H02M 1/00* (2006.01)

(52) U.S. Cl.
CPC ........ *H02M 3/07* (2013.01); *H02M 2001/009* (2013.01)

(58) Field of Classification Search
CPC .............................................. H02M 2003/072
See application file for complete search history.

(56) References Cited

U.S. PATENT DOCUMENTS

| 5,859,632 A * | 1/1999 | Ito ........................ G09G 3/3622 345/211 |
| 8,823,342 B2 * | 9/2014 | Williams .............. H02M 3/158 323/268 |

OTHER PUBLICATIONS

Jiang, J., et al., "20.5: A dual-symmetrical-output switched-capacitor converter with dynamic power cells and minimized cross regulation for application processors in 28nm CMOS," Proceedings of the 2017 IEEE International Solid-State Circuits Conference (ISSCC), Feb. 5-9, 2017, San Francisco, California, USA, pp. 344-345.

(Continued)

*Primary Examiner* — Jeffery S Zweizig
(74) *Attorney, Agent, or Firm* — Withrow & Terranova, P.L.L.C.

(57) ABSTRACT

A switched capacitor DC-DC converter, which includes a pulse frequency modulation circuit, a multiplexing pulse-width modulation circuit, and a switched capacitive element, is disclosed. The switched capacitive element is coupled between the pulse frequency modulation circuit and the multiplexing pulse-width modulation circuit. The pulse frequency modulation circuit uses a DC source signal to charge the switched capacitive element. The pulse frequency modulation circuit provides a group of output signals by multiplexing the switched capacitive element and reduces reverse current to the switched capacitive element when updating each of the group of output signals.

20 Claims, 6 Drawing Sheets

(56) References Cited

OTHER PUBLICATIONS

Jung, W., et al., "8.5: A 60%-efficiency 20nW-500μW tri-output fully integrated power management unit with environmental adaptation and load-proportional biasing for IoT systems," Proceedings of the 2016 IEEE International Solid-State Circuits Conference (ISSCC), Jan. 31-Feb. 4, 2016, San Francisco, California, USA, pp. 154-155.

Kilani, D., et al., "An Efficient Switched-Capacitor DC-DC Buck Converter for Self-Powered Wearable Electronics," IEEE Transactions on Circuits and Systems I: Regular Papers, vol. 63, Issue 10, Sep. 19, 2016, pp. 1557-1566.

Kim, H., et al., "A low power ECG signal processor for ambulatory arrhythmia monitoring system," Proceedings of the 2010 IEEE Symposium on VLSI Circuits (VLSIC)/Technical Digest of Technical Papers, Jun. 16-18, 2010, Honolulu, Hawaii, USA, pp. 19-20.

Mohammad, B., et al., "A reduced voltage swing circuit using a single supply to enable lower voltage operation for SRAM-based memory," Microelectronics Journal, vol. 43, No. 2, Feb. 2012, pp. 110-118.

Teh, C. K, et al., "12.3: A 2-output step-up/step-down switched-capacitor DC-DC converter with 95.8% peak efficiency and 0.85-to-3.6 V input voltage range," Proceedings of the 2016 IEEE International Solid-State Circuits Conference (ISSCC), Jan. 31-Feb. 4, 2016, San Francisco, California, USA, pp. 222-223.

\* cited by examiner

METHODS AND APPARATUS FOR SIMULTANEOUSLY GENERATING MULTIPLE OUTPUT VOLTAGE LEVELS UTILIZING SWITCHED CAPACITOR DC-DC CONVERTER

RELATED APPLICATIONS

This application claims the benefit of U.S. Provisional Patent Application Ser. No. 62/557,095 filed Sep. 11, 2017, the disclosure of which is incorporated herein by reference in its entirety.

FIELD OF THE DISCLOSURE

Embodiments of the present disclosure relate to switched capacitor direct current (DC)-DC converters, which may be used to simultaneously provide multiple DC supply output voltages.

BACKGROUND

As technology advances, many electronics devices may require multiple simultaneous DC supply voltages. For example, such devices may include multiple functional units, such as wireless sensor nodes (WSN)s, Internet of Things (IoT)s, or the like. Some of these devices may require high efficiency, be battery powered, portable, inexpensive, or any combination thereof. However, traditional DC-DC converters that provide multiple simultaneous DC supply voltages may have reduced efficiency and area overhead due to certain circuit architectures associated with updating the DC supply voltages. In this regard, there is a need for a small, inexpensive DC-DC converter that efficiently provides multiple simultaneous DC supply voltages.

SUMMARY

A switched capacitor DC-DC converter, which includes a pulse frequency modulation circuit, a multiplexing pulse-width modulation circuit, and a switched capacitive element, is disclosed according to one embodiment of the present disclosure. The switched capacitive element is coupled between the pulse frequency modulation circuit and the multiplexing pulse-width modulation circuit. The pulse frequency modulation circuit uses a DC source signal to charge the switched capacitive element. The pulse frequency modulation circuit provides a group of output signals by multiplexing the switched capacitive element and reduces reverse current to the switched capacitive element when updating each of the group of output signals.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

A switched capacitor DC-DC converter, which includes a pulse frequency modulation (PFM) circuit, a multiplexing pulse-width modulation (PWM) circuit, and a switched capacitive element; is disclosed according to one embodiment of the present disclosure. The switched capacitive element is coupled between the pulse frequency modulation circuit and the multiplexing pulse-width modulation circuit. The pulse frequency modulation circuit uses a DC source signal to charge the switched capacitive element. The pulse frequency modulation circuit provides a group of output signals by multiplexing the switched capacitive element and reduces reverse current to the switched capacitive element when updating each of the group of output signals.

Figure 1:
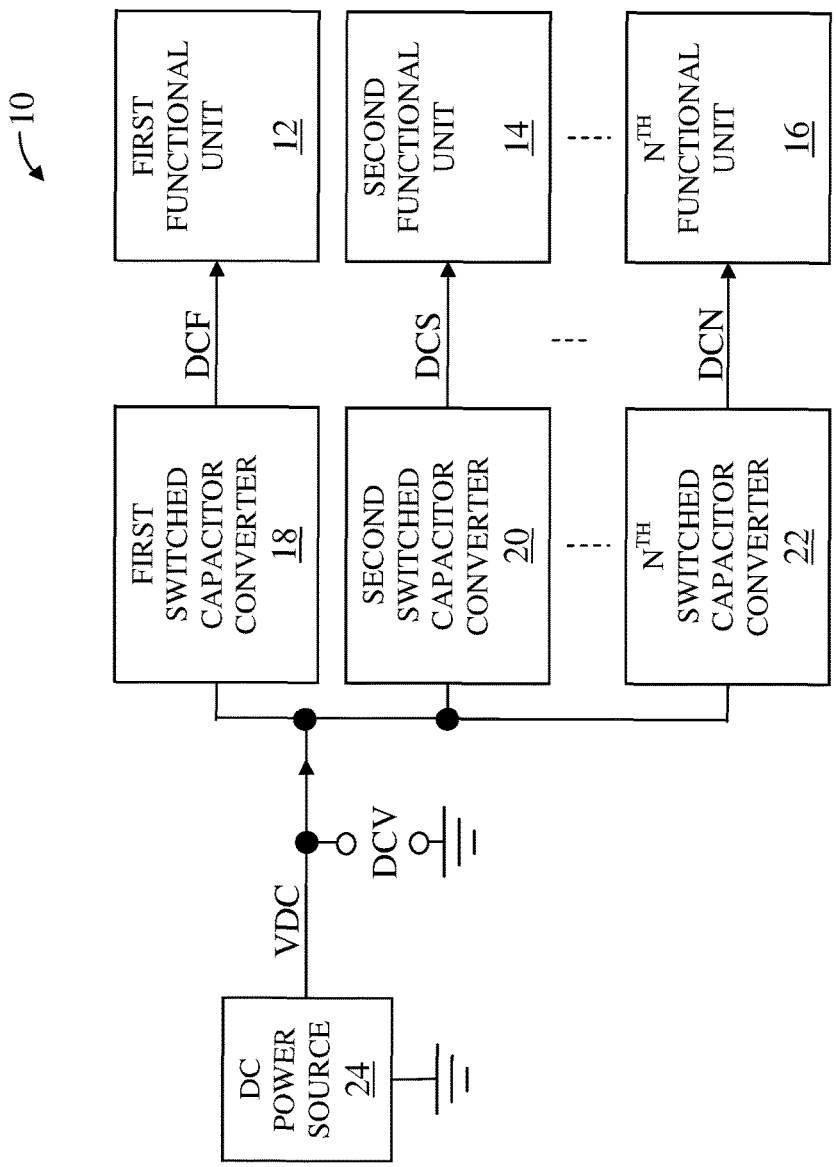
FIG. 1 shows a functional system according to the prior art.

FIG. 1 shows a functional system 10 according to the prior art. The functional system 10 includes a first functional unit 12, a second functional unit 14, and up to and including an $N^{TH}$ functional unit 16. In general, the functional system 10 includes a group of functional units 12, 14, 16. In addition, the functional system 10 includes a first switched capacitor converter 18, a second switched capacitor converter 20, and up to and including an $N^{TH}$ switched capacitor converter 22. In general, the functional system 10 further includes a group of switched capacitor converters 18, 20, 22. The functional system 10 further includes a DC power source 24, which provides a DC source signal VDC to each of the group of switched capacitor converters 18, 20, 22. The DC source signal VDC has a DC source voltage DCV.

The first switched capacitor converter 18 provides a first DC output voltage DCF to the first functional unit 12. The second switched capacitor converter 20 provides a second DC output voltage DCS to the second functional unit 14. The $N^{TH}$ switched capacitor converter 22 provides an $N^{TH}$ DC output voltage DCN to the $N^{TH}$ functional unit 16. In this regard, the group of switched capacitor converters 18, 20, 22 provides a corresponding group of DC output voltages DCF, DCS, DCN to the group of functional units 12, 14, 16. Dedicating a corresponding one of the group of switched capacitor converters 18, 20, 22 to each of the group of functional units 12, 14, 16 may be an expensive approach.

Figure 2:
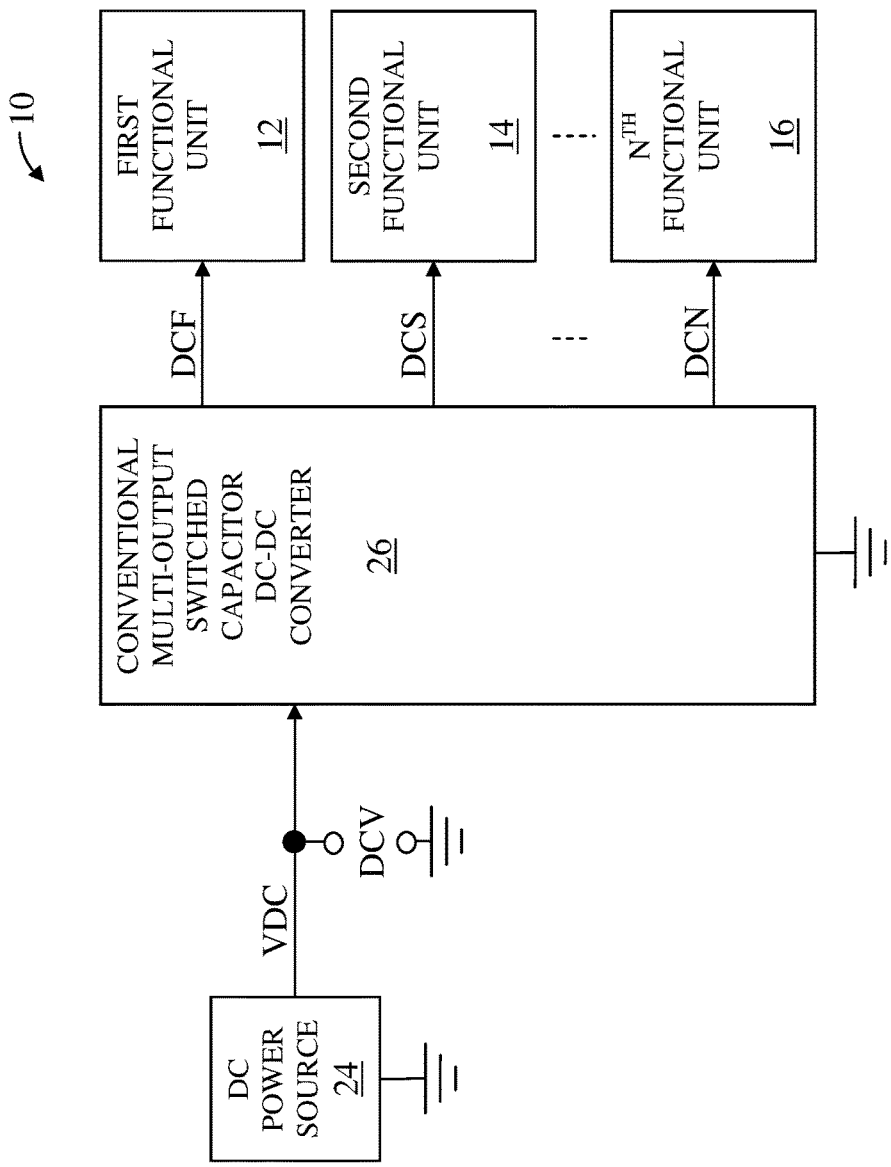
FIG. 2 shows a functional system according to an alternate embodiment of the prior art.

FIG. 2 shows a functional system 10 according to an alternate embodiment of the prior art. The functional system 10 illustrated in FIG. 2 is similar to the functional system 10 illustrated in FIG. 1 except in the functional system 10 illustrated in FIG. 2, the group of switched capacitor converters 18, 20, 22 are replaced with a conventional multi-output switched capacitor DC-DC converter 26. In this regard, the DC power source 24 provides the DC source signal VDC to the conventional multi-output switched capacitor DC-DC converter 26, which provides the group of DC output voltages DCF, DCS, DCN to the group of functional units 12, 14, 16.

Figure 3:
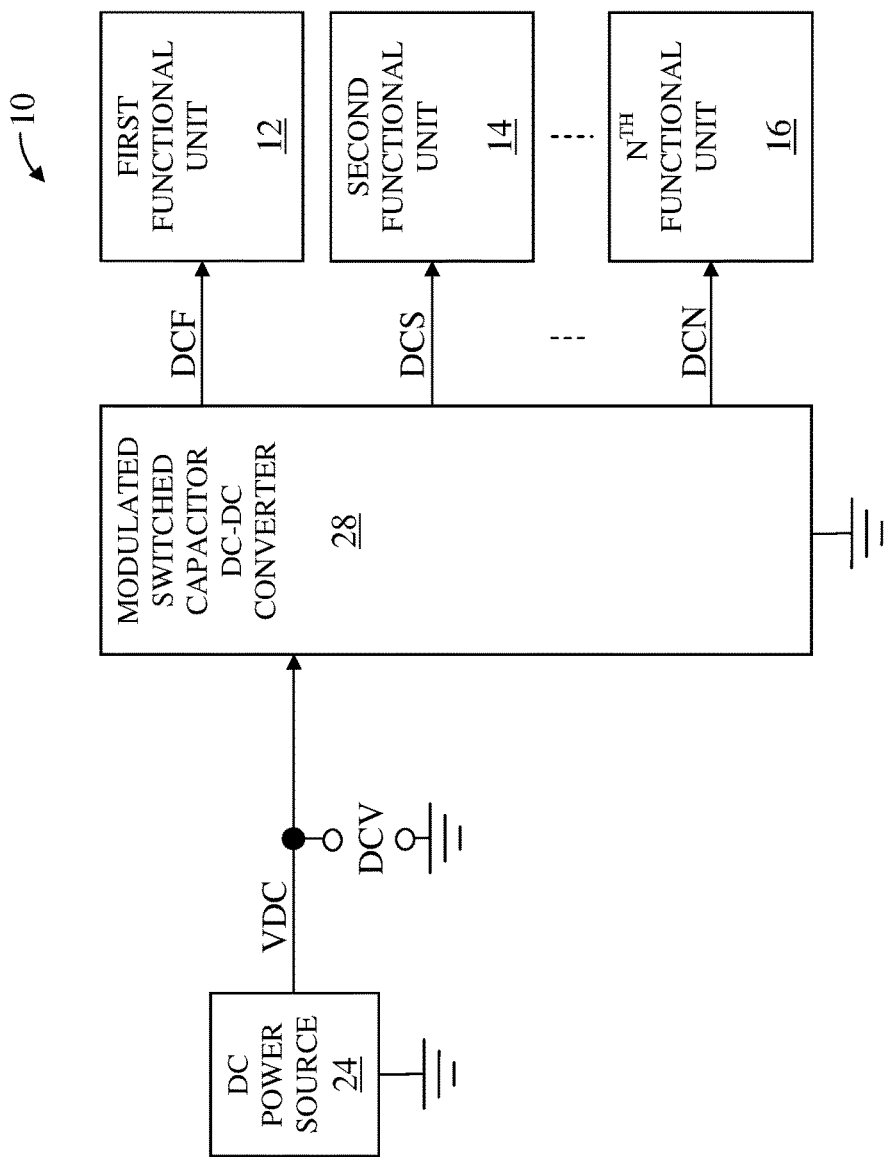
FIG. 3 shows a functional system according to one embodiment of the present disclosure.

FIG. 3 shows a functional system 10 according to one embodiment of the present disclosure. The functional system 10 illustrated in FIG. 3 is similar to the functional system 10 illustrated in FIG. 2 except in the functional system 10 illustrated in FIG. 3, the group of switched capacitor converters 18, 20, 22 are replaced with a modulated switched capacitor DC-DC converter 28. In this regard, the DC power source 24 provides the DC source signal VDC to the modulated switched capacitor DC-DC converter 28, which provides the group of DC output voltages DCF, DCS, DCN to the group of functional units 12, 14, 16.

Figure 4:
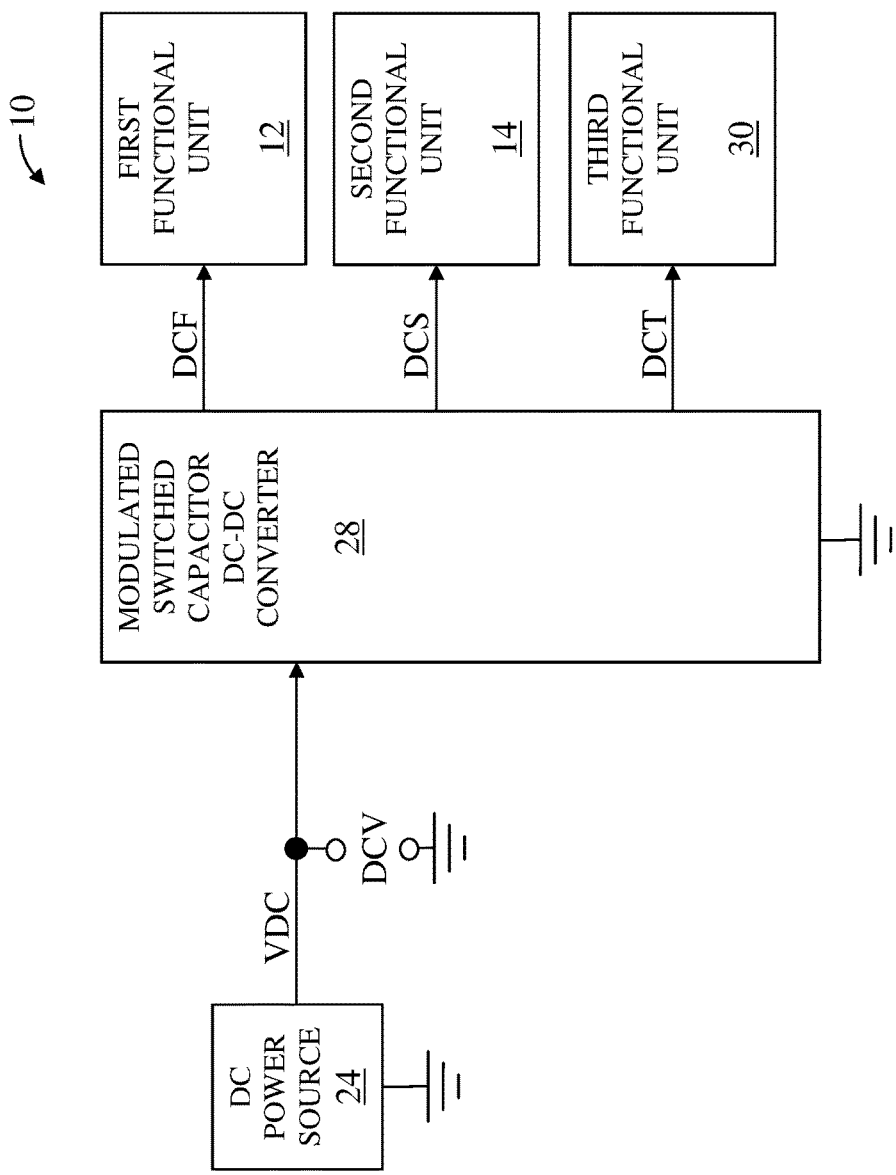
FIG. 4 shows a functional system according to an alternate embodiment of the present disclosure.

FIG. 4 shows a functional system 10 according to an alternate embodiment of the present disclosure. The functional system 10 illustrated in FIG. 4 is similar to the functional system 10 illustrated in FIG. 3 except in the functional system 10 illustrated in FIG. 4, the group of functional units 12, 14, 16 is replaced with the first functional unit 12, the second functional unit 14, and a third functional unit 30, such that the modulated switched capacitor DC-DC converter 28 provides the first DC output voltage DCF to the first functional unit 12, the second DC output voltage DCS to the second functional unit 14, and a third DC output voltage DCT to the third functional unit 30.

Figure 5:
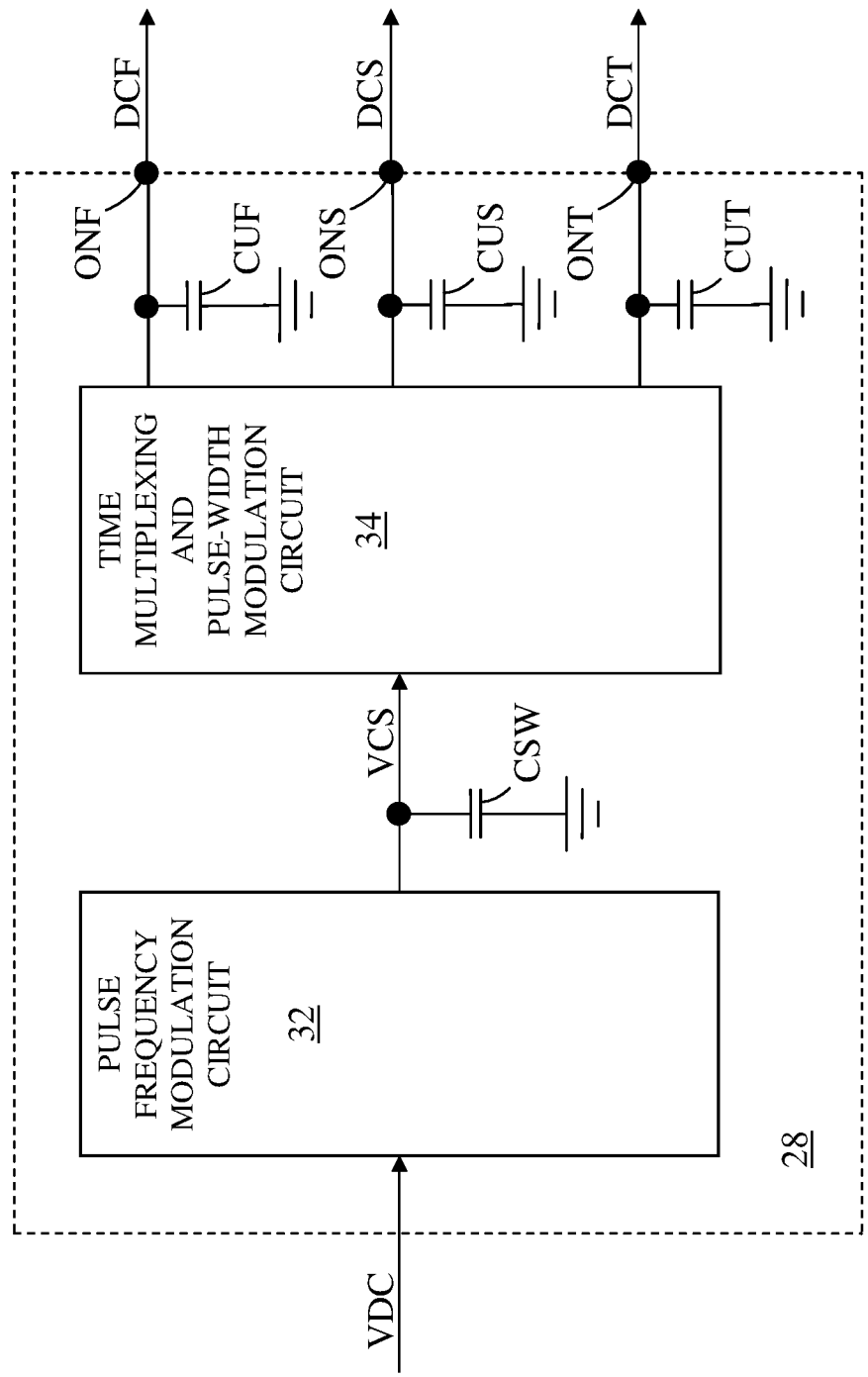
FIG. 5 shows details of a modulated switched capacitor DC-DC converter illustrated in FIG. 4 according to one embodiment of the modulated switched capacitor DC-DC converter.

FIG. 5 shows details of the modulated switched capacitor DC-DC converter 28 illustrated in FIG. 4 according to one embodiment of the modulated switched capacitor DC-DC converter 28. The modulated switched capacitor DC-DC converter 28 includes a pulse frequency modulation (PFM) circuit 32, a time multiplexing and pulse-width modulation (PWM) circuit 34, a first output connection node ONF, a second output connection node ONS, a third output connection node ONT, a first output capacitive element CUF, a second output capacitive element CUS, a third output capacitive element CUT, and a switched capacitive element CSW. The switched capacitive element CSW is coupled between the PFM circuit 32 and ground and further coupled between the time multiplexing and PWM circuit 34 and ground. The switched capacitive element CSW has a switching capacitance voltage VCS.

Figure 6:
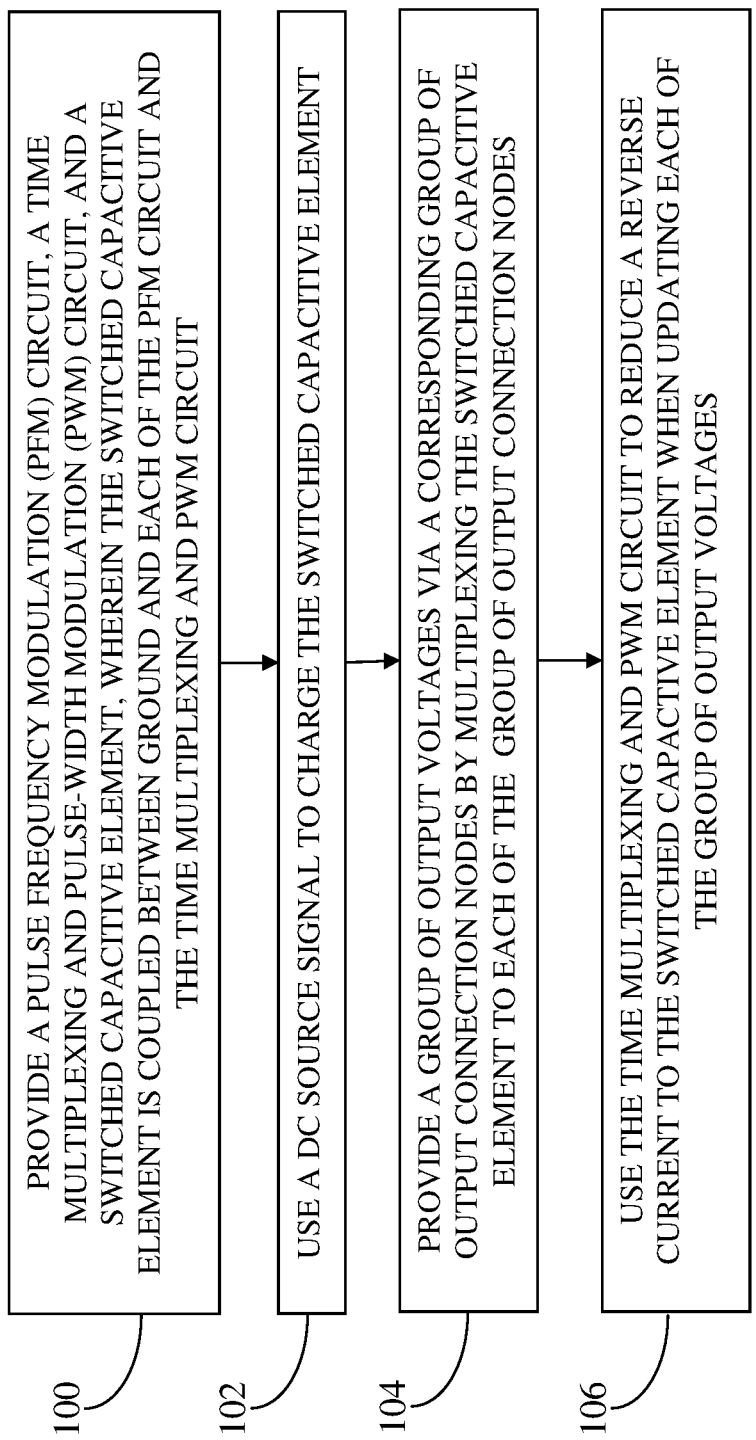
FIG. 6 shows a process for operating the modulated switched capacitor DC-DC converter illustrated in FIG. 5 according to one embodiment of the DC-DC converter.

FIG. 6 shows a process for operating the modulated switched capacitor DC-DC converter 28 illustrated in FIG. 5. To start the process, provide the pulse frequency modulation (PFM) circuit 32, the time multiplexing and pulse-width modulation (PWM) circuit 34, and the switched capacitive element CSW, such that the switched capacitive element CSW is coupled between ground and each of the PFM circuit 32 and the time multiplexing and PWM circuit 34 (Step 100). Use the DC source signal VDC to charge the switched capacitive element CSW (Step 102). Provide a group of output voltages DCF, DCS, DCT via a corresponding group of output connection nodes ONF, ONS, ONT (Step 104). Use the time multiplexing and PWM circuit 34 to reduce a reverse current to the switched capacitive element CSW when updating each of the group of output voltages DCF, DCS, DCT (Step 106).

In one embodiment of the process for operating the modulated switched capacitor DC-DC converter 28, the process for operating the modulated switched capacitor DC-DC converter 28 further includes inhibiting the reverse current to the switched capacitive element CSW when updating each of the plurality of output voltages DCF, DCS, DCT. In one embodiment of the process for operating the modulated switched capacitor DC-DC converter 28, the process for operating the modulated switched capacitor DC-DC converter 28 further includes reducing the reverse current to the switched capacitive element CSW when updating each of the group of output voltages DCF, DCS, DCT.

In one embodiment of the process for operating the modulated switched capacitor DC-DC converter 28, the group of output voltages comprises the first output voltage DCF, the second output voltage DCS, and the third output voltage DCT. In one embodiment of the process for operating the modulated switched capacitor DC-DC converter 28, the first output voltage DCF is nominally equal to 0.6 volts, the second output voltage DCS is nominally equal to 0.8 volts, and the third output voltage DCT is nominally equal to 1.0 volt. In one embodiment of the process for operating the modulated switched capacitor DC-DC converter 28, a magnitude of the second output voltage DCS is greater than a magnitude of the first output voltage DCF, and a magnitude of the third output voltage DCT is greater than the magnitude of the second output voltage DCS.

In one embodiment of the process for operating the modulated switched capacitor DC-DC converter 28, a duty-cycle of each of the group of output voltages DCF, DCS, DCT is directly related to a load current associated with each of the group of output voltages DCF, DCS, DCT. In one embodiment of the process for operating the modulated switched capacitor DC-DC converter 28, an order in which each of the group of output voltages DCF, DCS, DCT is updated is directly related to a load current associated with each of the group of output voltages DCF, DCS, DCT.

Those skilled in the art will recognize improvements and modifications to the preferred embodiments of the present disclosure. All such improvements and modifications are considered within the scope of the concepts disclosed herein and the claims that follow.

What is claimed is:

1. A modulated switched capacitor DC-DC converter comprising:
   a switched capacitive element coupled between a pulse frequency modulation (PFM) circuit and a time multiplexing and pulse-width modulation (PWM) circuit;
   the PFM circuit configured to use a DC source signal to charge the switched capacitive element; and
   the time multiplexing and PWM circuit configured to:
      provide a plurality of output voltages via a corresponding plurality of output connection nodes by multiplexing the switched capacitive element to each of the plurality of output connection nodes; and
      reduce a reverse current to the switched capacitive element when updating each of the plurality of output voltages.

2. The modulated switched capacitor DC-DC converter of claim 1 wherein the time multiplexing and PWM circuit is further configured to inhibit the reverse current to the switched capacitive element when updating each of the plurality of output voltages.

3. The modulated switched capacitor DC-DC converter of claim 1 wherein the PFM circuit is configured to further reduce the reverse current to the switched capacitive element when updating each of the plurality of output voltages.

4. The modulated switched capacitor DC-DC converter of claim 1 wherein the plurality of output voltages comprises a first output voltage, a second output voltage, and a third output voltage.

5. The modulated switched capacitor DC-DC converter of claim 4 wherein the first output voltage is nominally equal to 0.6 volts, the second output voltage is nominally equal to 0.8 volts, and the third output voltage is nominally equal to 1.0 volt.

6. The modulated switched capacitor DC-DC converter of claim 4 wherein a magnitude of the second output voltage is greater than a magnitude of the first output voltage, and a magnitude of the third output voltage is greater than the magnitude of the second output voltage.

7. The modulated switched capacitor DC-DC converter of claim 6 wherein when the plurality of output voltages are initially provided, the first output voltage is initialized first, the second output voltage is initialized after the first output voltage is initialized, and the third output voltage is initialized after the second output voltage is initialized.

8. The modulated switched capacitor DC-DC converter of claim 1 wherein a duty-cycle of each of the plurality of output voltages is directly related to a load current associated with each of the plurality of output voltages.

9. The modulated switched capacitor DC-DC converter of claim 1 wherein an order in which each of the plurality of output voltages is updated is directly related to a load current associated with each of the plurality of output voltages.

10. The modulated switched capacitor DC-DC converter of claim 1 further comprising a plurality of output capacitive elements, wherein each of the plurality of output capacitive elements is coupled between a corresponding one of the plurality of output connection nodes and ground.

11. The modulated switched capacitor DC-DC converter of claim 1 wherein a DC power source is configured to provide the DC source signal.

12. The modulated switched capacitor DC-DC converter of claim 11 wherein the DC power source is a battery.

13. A method comprising:
providing a pulse frequency modulation (PFM) circuit, a time multiplexing and pulse-width modulation (PWM) circuit, and a switched capacitive element, wherein the switched capacitive element is coupled between ground and each of the PFM circuit and the time multiplexing and PWM circuit;
using a DC source signal to charge the switched capacitive element;
providing a plurality of output voltages via a corresponding plurality of output connection nodes by multiplexing the switched capacitive element to each of the plurality of output connection nodes; and
using the time multiplexing and PWM circuit to reduce a reverse current to the switched capacitive element when updating each of the plurality of output voltages.

14. The method of claim 13 further comprising inhibiting the reverse current to the switched capacitive element when updating each of the plurality of output voltages.

15. The method of claim 14 further comprising reducing the reverse current to the switched capacitive element when updating each of the plurality of output voltages.

16. The method of claim 13 wherein the plurality of output voltages comprises a first output voltage, a second output voltage, and a third output voltage.

17. The method of claim 16 wherein the first output voltage is nominally equal to 0.6 volts, the second output voltage is nominally equal to 0.8 volts, and the third output voltage is nominally equal to 1.0 volt.

18. The method of claim 16 wherein a magnitude of the second output voltage is greater than a magnitude of the first output voltage, and a magnitude of the third output voltage is greater than the magnitude of the second output voltage.

19. The method of claim 13 wherein a duty-cycle of each of the plurality of output voltages is directly related to a load current associated with each of the plurality of output voltages.

20. The method of claim 13 wherein an order in which each of the plurality of output voltages is updated is directly related to a load current associated with each of the plurality of output voltages.

* * * * *